(12) United States Patent
Arwatz (10) Patent No.: US 11,592,838 B2
(45) Date of Patent: Feb. 28, 2023

(54) VELOCITY SENSING FOR AIRCRAFT

(71) Applicant: INSTRUMEMS INC., Los Altos, CA (US)

(72) Inventor: Gilad Arwatz, Los Altos, CA (US)

(73) Assignee: INSTRUMEMS INC., Los Altos, CA (US)

( * ) Notice: Subject to any disclaimer, the term of this patent is extended or adjusted under 35 U.S.C. 154(b) by 1008 days.

(21) Appl. No.: 16/288,829

(22) Filed: Feb. 28, 2019

(65) Prior Publication Data

US 2019/0265732 A1   Aug. 29, 2019

Related U.S. Application Data (60) Provisional application No. 62/636,270, filed on Feb. 28, 2018.

(51) Int. Cl.
*G05D 1/08* (2006.01)
*B64C 39/02* (2006.01)
(Continued)

(52) U.S. Cl.
CPC .......... *G05D 1/0816* (2013.01); *B64C 17/00* (2013.01); *B64C 39/024* (2013.01); *G01P 5/10* (2013.01);
(Continued)

(58) Field of Classification Search
CPC . B64C 17/00; B64C 39/024; B64C 2201/027; B64C 2201/108; B64C 2201/14; B64C 1/00–2230/28; G01P 11/00; G01P 13/045; G01P 3/62; G01P 5/00–26; G05D 1/0816; G05D 1/046; G05D 1/0808; G05D 1/0692; G05D 1/048; G05D 1/00–12;
(Continued)

(56) References Cited

U.S. PATENT DOCUMENTS 5,753,815 A    5/1998  Murata
6,821,090 B1 * 11/2004  Hassan ................ B64C 27/467
                                                    416/42

(Continued)

FOREIGN PATENT DOCUMENTS

EP    3469925 A1   4/2019
JP    H07-148485   6/1995
WO    2017116499   7/2017

OTHER PUBLICATIONS

M. Valikivi, Turbulence measurements in pipe flow using a nanoscale thermal anemometry probe, 2011, Experiment Fluids (Year: 2011).*

(Continued)

*Primary Examiner* — Angelina Shudy
*Assistant Examiner* — Mohamed Abdo Algehaim
(74) *Attorney, Agent, or Firm* — Sughrue Mion, PLLC (57) ABSTRACT

A method for measuring a windspeed vector is described. A true airspeed vector of a flying machine is measured while the machine is in flight using one or more nanowires on the flying machine. Each nanowire is configured to measure a value of local air velocity relative to the flying machine. A velocity of the flying machine relative to the ground is measured while the machine is in flight, and then (a) the true airspeed vector is subtracted from (b) the velocity of the flying machine relative to the ground. Other applications are also described.

20 Claims, 5 Drawing Sheets

(51) Int. Cl.
B64C 17/00 (2006.01)
G01P 5/10 (2006.01)
G01P 5/12 (2006.01)
G05D 1/04 (2006.01)

(52) U.S. Cl.
CPC ............... *G01P 5/12* (2013.01); *G05D 1/046* (2013.01); *B64C 2201/027* (2013.01); *B64C 2201/108* (2013.01); *B64C 2201/14* (2013.01)

(58) Field of Classification Search
CPC ..... G05D 1/06–0692; G05D 1/04–048; G05D 1/10–12; G01S 13/00; G01S 13/02; G01S 13/95; G01S 17/02; G01S 17/50; G01S 17/58; G01S 17/66; G01S 17/95
USPC .......................................................... 702/85
See application file for complete search history.

(56) References Cited

U.S. PATENT DOCUMENTS

| | | | |
|---|---|---|---|
| 7,591,193 | B2 | 9/2009 | Snell et al. |
| 10,101,443 | B1* | 10/2018 | LeGrand, III ........ B64C 39/024 |
| 10,901,077 | B1* | 1/2021 | LeGrand, III .......... G01P 5/245 |
| 11,187,715 | B2* | 11/2021 | Fan ......................... G01P 1/006 |
| 2005/0049805 | A1 | 3/2005 | Bonne et al. |
| 2007/0250276 | A1 | 10/2007 | Mangalam et al. |
| 2008/0066541 | A1 | 3/2008 | Burton |
| 2008/0066557 | A1 | 3/2008 | Yoshida |
| 2008/0184769 | A1 | 8/2008 | McKinney |
| 2010/0131230 | A1* | 5/2010 | Perrie ....................... G01P 5/26 |
| | | | 702/144 |
| 2011/0308312 | A1 | 12/2011 | Moro |
| 2012/0216631 | A1* | 8/2012 | Huhnd .................. G01M 9/062 |
| | | | 73/862.381 |
| 2014/0355969 | A1 | 12/2014 | Stern |
| 2015/0075280 | A1 | 3/2015 | Hultmark et al. |
| 2015/0305404 | A1 | 10/2015 | Rosales |
| 2015/0336671 | A1* | 11/2015 | Winn .................... G05D 1/0094 |
| | | | 701/3 |
| 2016/0007653 | A1 | 1/2016 | Tu |
| 2016/0018334 | A1 | 1/2016 | Tomar et al. |
| 2016/0114903 | A1* | 4/2016 | Claudel ................. B64C 39/024 |
| | | | 701/3 |
| 2016/0219938 | A1 | 8/2016 | Mamoun et al. |
| 2016/0366939 | A1 | 12/2016 | Alarcon et al. |
| 2017/0052044 | A1* | 2/2017 | Renger ..................... G01P 5/22 |
| 2017/0122892 | A1* | 5/2017 | Li ......................... G01N 27/121 |
| 2017/0138799 | A1 | 5/2017 | Arwatz et al. |
| 2017/0233073 | A1* | 8/2017 | Ao ........................... G01L 19/14 |
| | | | 454/184 |
| 2017/0253330 | A1* | 9/2017 | Saigh .................... G08G 5/0069 |
| 2017/0293307 | A1* | 10/2017 | Frolov ................... B64D 43/02 |
| 2018/0058889 | A1 | 3/2018 | Arwatz et al. |
| 2018/0237155 | A1* | 8/2018 | Ueda ....................... B64C 27/08 |
| 2018/0252559 | A1* | 9/2018 | Hultmark ................. G01P 5/02 |
| 2018/0267560 | A1* | 9/2018 | Zhu .......................... B64C 19/00 |
| 2018/0292817 | A1* | 10/2018 | Yang ....................... G08G 5/003 |
| 2019/0094885 | A1* | 3/2019 | Matsuda ................ G01C 5/005 |
| 2019/0317122 | A1* | 10/2019 | Zhang .................... G01S 15/885 |
| 2020/0141772 | A1* | 5/2020 | Hultmark ................. G01F 1/28 |
| 2020/0341492 | A1* | 10/2020 | Thomassey ............ G05D 1/102 |
| 2021/0011488 | A1* | 1/2021 | Kearney-Fischer ... G05D 1/046 |
| 2021/0311205 | A1* | 10/2021 | Davidson .............. B64C 39/024 |

OTHER PUBLICATIONS

Alexander J. Smits, Nanoscale Instrumentation for Measuring Turbulence, 2014, 19th Australasian Fluid Mechanics Conference (Year: 2014).*

Gilad Arwatz, Development and characterization of a nano-scale temperature sensor (T-NSTAP) for turbulent temperature measurements, 2015, Measurement Science and Technology (Year: 2015).*

Jack S. Elston, Covariance Analysis of Sensors for Wind Field Estimation by Small Unmanned Aircraft, 2015, American Institute of Aeronautics Inc. (Year: 2015).*

S. Prudden, An Anemometer for UAS-based Atmospheric Wind Measurements, 2017, 17th Australian Aerospace Congress (Year: 2017).*

Matthew K. Fu, Design and Validation of a nanoscale cross-wire probe (X-NSTAP), 2019, Experiments in Fluids (Year: 2019).*

Matthew T. Simmons, Wind Tunnel Tests of a Pitot-Static Tube Array to Estimate Wind Velocity, 2019, Facility for Aerial Systems and Technology University of South Alabama (Year: 2019).*

U.S. Appl. No. 62/636,270, filed Feb. 28, 2018.

Fan, Y., et al. "Nanoscale sensing devices for turbulence measurements." Experiments in Fluids 56.7 (2015): 138.

An International Search Report and a Written Opinion both dated Oct. 14, 2020, which issued during the prosecution of Applicant's PCT/US2020/042270.

An Office Action dated Sep. 9, 2019, which issued during the prosecution of U.S. Appl. No. 15/685,721.

An Office Action dated Apr. 17, 2020, which issued during the prosecution of U.S. Appl. No. 15/685,721.

* cited by examiner

VELOCITY SENSING FOR AIRCRAFT

CROSS-REFERENCE TO RELATED APPLICATIONS

The present application claims the priority of U.S. 62/636,270 to Arwatz, filed Feb. 28, 2018 entitled, "Velocity sensing for aircraft," which is incorporated herein by reference.

FIELD OF THE INVENTION

The present invention relates to nanowire sensors for sensing velocity of a fluid flow.

BACKGROUND

The dissertation of Gilad Arwatz, Ph.D., entitled "Investigations of the fundamentals of passive scalar dynamics using nano-sensing devices," Princeton University, 2015, which is incorporated herein by reference, describes turbulence as being the core of numerous investigations over several decades. Among the wide spectrum of turbulence aspects in the study described in the dissertation, the study focuses on temperature as a passive scalar advected in a turbulent velocity field. In this study, fundamental flow quantities are revisited by investigating statistically homogeneous and isotropic turbulence, with an imposed mean cross-stream linear temperature gradient. This is described as being made possible by developing a new fast response nano-sensor to minimize measurement errors inherent in conventional temperature probes (cold wires). As described in the study, it was observed that cold wire attenuation has widespread effects on most aspects of the measurements, resulting in the variance and the scalar rate of dissipation being significantly underestimated.

Newly acquired data allow for a theoretical study of the temperature spectra, the dissipation range, different scaling laws and intermittencies. By studying the evolution equations of the temperature spectra, conditions for self-preserving solutions were derived and described as being experimentally validated. Self-similarity of the dissipation subrange was explored, and described as revealing that the temperature field can be independently resolved without knowledge of the velocity field. The results are described as raising interesting questions about the underlying behavior of the scalar field, namely local equilibrium versus non-equilibrium.

Based on the proposed scaling and the significant departure of existing models from the expected power-law behavior in the inertial range, a model spectrum was developed based entirely on temperature-related variables, described as showing a convincing agreement with the experimental data in the dissipation range.

The underlying cause of scalar intermittencies, a well-established phenomenon reflected in the exponential tails of the scalar probability density function (PDF), is described as yet to be determined. The interplay between advection and diffusion was investigated through their timescales ratio, following the linear eddy model of Kerstein. The analysis is described as revealing a widening of the PDF as more of the low frequency content is excluded. The development of the new sensor, along with the fundamental study, is described as inspiring new ideas for measuring conductivity as a way to assess humidity in the atmospheric boundary layer or blood damage due to shear stresses. Overall, the study is described as shedding light on the importance of accurate and optimized measurement techniques in the pursuit of understanding turbulence.

An article entitled "Nanoscale sensing devices for turbulence measurements" by Y. Fan et al., which is incorporated herein by reference, describes a collection of nanoscale sensing devices developed specifically for high-frequency turbulence measurements. The sensors are all derived from the nanoscale thermal anemometry probe (NSTAP), which uses a free-standing platinum wire as an active sensing element. Each sensor is described as (a) being designed and fabricated to measure a specific quantity and (b) being customizable for special applications. In addition to the original NSTAP (for single-component velocity measurement), the sensors include the T-NSTAP (for temperature measurement), the x-NSTAP (for two-component velocity measurement), and the q-NSTAP (for humidity measurement). This article provides a summary of the NSTAP family including details of design and fabrication as well as presentation of flow measurements using these sensors. Also, a custom-made constant-temperature anemometer, described as allowing proper operation of the NSTAP sensors, is introduced.

One of the largest challenges to a comprehensive understanding of high Reynolds number turbulence is the inability for traditional sensors to measure the smallest fluctuations in turbulent flows (which are on the order of a few microns in diameter). Traditionally, hot wires were considered the state-of-the-art sensing technique for studying turbulence dissipation; however, the frequency response and spatial resolution of these sensors were still too coarse to accurately capture and characterize the smallest turbulent eddies. This motivated the design and fabrication of a nanoscale anemometry probe (NSTAP), which consists of a nanoscale, free-standing platinum wire that is suspended between two silicon supports. NSTAPs are manufactured using Micro-Electro-Mechanical Systems (MEMS) and standard semiconductor manufacturing techniques. The nanowire probes can be operated as thermal anemometers, similar to hot wires, in order to measure the velocity of fluid flow. The small size and optimized geometry of the nanowires enable them to sense velocity fluctuations at a higher frequency and spatial precision than traditional hot wires, which allows them to be used to measure the previously unmeasurable rapidly fluctuating, smallest eddies in high Reynolds number turbulent flows.

SUMMARY OF THE INVENTION

In accordance with an application of the present invention, a method is provided for measuring a windspeed vector by measuring a true airspeed vector of a flying machine while the machine is in flight, measuring a velocity of the flying machine relative to the ground while the machine is in flight, and subtracting the true airspeed vector from the velocity of the flying machine relative to the ground. The true airspeed vector is measured using one or more nanowires on the flying machine, each nanowire measuring a value of local air velocity relative to the flying machine.

In accordance with some applications of the present invention, a method is provided for stabilizing a flying machine while the flying machine is in flight by using at least one sensor on the flying machine to measure a local air velocity relative to the flying machine at the location of the sensor, the sensor including a plurality of nanowires and a computer processor. Each of the nanowires measures a value of local air velocity relative to the flying machine, and the nanowires are positioned within the sensor such that the sensor measures the local air velocity relative to the flying machine in at least two dimensions, e.g., as a three-dimensional vector. The computer processor in the sensor receives from the nanowires real-time data indicative of the local air velocity relative to the flying machine, and transmits the data to a flight control system of the flying machine. The flight control system then uses the transmitted data indicative of local air velocity relative to the flying machine to stabilize the flying machine. In accordance with some applications of the present invention, a plurality of such sensors are placed at different locations on the flying machine to measure the local air velocity relative to the flying machine at a respective plurality of locations on the flying machine.

In accordance with an application of the present invention, a method is provided for measuring the true airspeed vector of a flying machine that has at least one rotating airfoil. Interference in the velocity field around the flying machine due to rotation of the rotating airfoil is overcome by operating one or more nanowires on the flying machine to measure a local air velocity relative to the flying machine at a measurement frequency that is at least two times greater than a rotation frequency of the rotating airfoil. The rotation frequency is then filtered out of the signal received from the nanowires.

In accordance with some applications of the present invention, apparatus is provided for measuring the true airspeed vector of a flying machine. A sensor is disposed on an outer surface of a flying machine and used to measure vector components of the true airspeed vector of the flying machine in at least two dimensions. The sensor includes a plurality of nanowires and control circuitry that operates the nanowires. Each of the nanowires measures a value of local air velocity relative to the flying machine, and the nanowires are positioned within the sensor such that an angle between at least one nanowire and at least one other nanowire is 30-90 degrees. Control circuitry in the sensor operates the plurality of nanowires to measure vector components of the true airspeed vector of the flying machine when the machine is in flight.

In general, a nanowire is composed of a small wire and is often suspended between two electrodes. Nanowires can be used to measure fluid flow properties, such as velocity, temperature, and humidity. A nanowire that is dimensioned for measuring velocity is capable of measuring high frequency velocity changes and can be operated in different modes of operation. A thermal nanowire typically measures velocity by convective cooling. The nanowire is heated up to a temperature that is above the ambient temperature, and the cooling of the wire by the ambient environment is then translated to velocity. Either a constant current anemometer (CCA) or constant temperature anemometer (CTA) may be used to operate the nanowire. When a CTA is used, the wire is kept at a constant temperature and a current used to maintain the nanowire at the constant temperature is monitored.

In addition to their measurement capabilities, the small size of the nanowire sensors makes them lightweight and low power. Thus, these real time velocity sensors can be leveraged for a variety of measurement and control applications. Furthermore, the MEMS-based fabrication process allows for batch production with a high-volume yield of identical sensors, allowing multiple sensors to be assembled in a sensor suite to measure multiple components of velocity.

In addition to measuring turbulence, the performance of these nanoscale probes fulfills a growing need to develop more robust control systems for flying machines. Currently the stabilization control systems for flying machines consists of an array of auxiliary sensors which measure the vehicle's state relative to the external environment. Examples of these sensors may include an accelerometer, gyroscope, GPS, and downward facing camera (optical flow). These sensor measurements are typically used to estimate the vehicle's state (angular orientation, angular velocity, position, and velocity). Then a control algorithm implemented on an onboard flight computer uses this estimation of the vehicle state to adjust outputs to the motors in order to stabilize the flying machine. Information about the external airflow (wind) surrounding the vehicle is generally lacking from these control schemes. Augmenting the sensor suite of a flying machine with airflow sensors enhances the stabilization capability of the control system. However, current options for airflow sensors are incompatible with flying machines, especially small un-manned aerial vehicles (UAVs). Pressure based velocity sensors, such as pitot tubes, are too slow to measure the rapidly fluctuating, highly turbulent airflow often encountered by UAVs. Hot wire anemometers can be faster, but are also bulky and require too much power to operate efficiently onboard a flying machine.

In accordance with some applications of the present invention, nanowire sensors are a superior alternative to traditional sensors used in stabilization control systems for flying machines. Their small size allows for minimally intrusive, lightweight mounting configurations on flying machines. Furthermore, their high level of accuracy and real time frequency response adds high fidelity data about external airflow (wind) as an input to the onboard control system.

There is therefore provided, in accordance with some applications of the present invention, a method for measuring a windspeed vector, the method including:

measuring a true airspeed vector of a flying machine while the machine is in flight using one or more nanowires on the flying machine, each nanowire being configured to measure a value of local air velocity relative to the flying machine;

measuring a velocity of the flying machine relative to the ground while the machine is in flight; and subtracting (a) the true airspeed vector from (b) the velocity of the flying machine relative to the ground.

For some applications, measuring a velocity of the flying machine relative to the ground includes using a global positioning system to measure the velocity of the flying machine relative to the ground while the machine is in flight.

For some applications, measuring a velocity of the flying machine relative to the ground includes using optical flow to measure the velocity of the flying machine relative to the ground while the machine is in flight.

For some applications, measuring the true airspeed vector of the flying machine using one or more nanowires on the flying machine includes operating the one or more nanowires to measure the local air velocity relative to the flying machine at a measurement frequency of 50 Hz-500 kHz.

For some applications, measuring the true airspeed vector of the flying machine using one or more nanowires on the flying machine includes operating the one or more nanowires to measure the local air velocity relative to the flying machine at a measurement frequency of 200 Hz-2000 Hz.

For some applications, measuring the true airspeed vector of the flying machine includes measuring true airspeed vector components in at least two dimensions by using at least two nanowires, the nanowires being positioned such that an angle between at least one nanowire and at least one other nanowire is 30-90 degrees.

For some applications, the nanowires are positioned such that at least one nanowire and at least one other nanowire are perpendicular to each other.

For some applications:
(a) measuring the true airspeed vector components in at least two dimensions includes (i) measuring the true airspeed vector components in two dimensions, and (ii) calculating components of the true airspeed vector in two respective dimensions that define a plane that is parallel to the ground, and
(b) the method further includes measuring a true airspeed vector component in a third dimension that is perpendicular to the plane that is parallel to the ground, by measuring a change in local barometric pressure at a sampling rate of 10-2000 Hz using a pressure sensor on the flying machine.

For some applications, measuring the change in local barometric pressure includes measuring the change in local barometric pressure at a sampling rate of 50-500 Hz using the pressure sensor on the flying machine.

For some applications:
(a) measuring the true airspeed vector components in at least two dimensions includes (i) measuring the true airspeed vector components in two dimensions, and (ii) calculating two components of the true airspeed vector in two respective dimensions that define a plane that is parallel to the ground, and
(b) the method further includes measuring a true airspeed vector component in a third dimension that is perpendicular to the plane that is parallel to the ground, by using a third nanowire positioned such that an angle between the third nanowire and the plane that is parallel to the ground is 30-90 degrees.

For some applications, measuring the true airspeed vector component in the third dimension includes measuring the true airspeed vector component in the third dimension that is perpendicular to the plane that is parallel to the ground, by using a third nanowire positioned such that the third nanowire is perpendicular to the plane that is parallel to the ground.

There is further provided, in accordance with some applications of the present invention, a method for stabilizing a flying machine while the machine is in flight, the method including:
using at least one sensor on the flying machine, measuring a local air velocity relative to the flying machine at the location of the sensor, the sensor comprising a plurality of nanowires and a computer processor,
(a) each of the nanowires being configured to measure a value of local air velocity relative to the flying machine, and
(b) the nanowires being positioned such that the sensor is configured to measure vector components of the local air velocity relative to the flying machine in at least two dimensions;
using the computer processor of the at least one sensor:
(a) receive from the nanowires real-time data indicative of the local air velocity relative to the flying machine, and
(b) transmit the data indicative of the local air velocity relative to the flying machine to a flight control system of the flying machine; and
using the flight control system, stabilizing the flying machine using the transmitted data.

For some applications, using the computer processor includes receiving from the nanowires real-time data indicative of the local air velocity relative to the flying machine, the local air velocity being indicative of a gust of wind; and using the flight control system comprises stabilizing the flying machine against the gust of wind using the transmitted data.

For some applications, measuring the local air velocity relative to the flying machine at the location of the sensor includes operating the sensor to measure the local air velocity relative to the flying machine at a measurement frequency of 50 Hz-500 kHz.

For some applications, measuring the local air velocity relative to the flying machine at the location of the sensor includes operating the sensor to measure the local air velocity relative to the flying machine at a measurement frequency of 200-2000 Hz.

For some applications, the nanowires being positioned such that the sensor is configured to measure vector components of the local air velocity relative to the flying machine in at least two dimensions includes the nanowires being positioned such that an angle between at least one nanowire and at least one other nanowire is 30-90 degrees.

For some applications, the nanowires being positioned includes the nanowires being positioned such that at least one nanowire and at least one other nanowire are perpendicular to each other.

For some applications:
(a) the nanowires being positioned such that the sensor is configured to measure vector components of the local air velocity relative to the flying machine in at least two dimensions includes the nanowires being positioned such that the sensor is configured to measure vector components of the local air velocity relative to the flying machine in two dimensions; and
(b) the method further includes:
(i) calculating two vector components of the local air velocity relative to the flying machine in two respective dimensions that define a plane that is parallel to the ground, and
(ii) measuring a component of the local air velocity relative to the flying machine in a third dimension that is perpendicular to the plane that is parallel to the ground, by measuring a change in local barometric pressure at a sampling rate of 10-2000 Hz using a pressure sensor on the flying machine.

For some applications, measuring the change in local barometric pressure includes measuring the change in local barometric pressure at a sampling rate of 50-500 Hz using the pressure sensor on the flying machine.

For some applications:
(a) the nanowires being positioned such that the sensor is configured to measure vector components of the local air velocity relative to the flying machine in at least two dimensions includes the nanowires being positioned such that the sensor is configured to measure vector components of the local air velocity relative to the flying machine in two dimensions, and
(b) the method further includes:
(i) calculating two vector components of the local air velocity relative to the flying machine in two respective dimensions that define a plane that is parallel to the ground; and
(ii) measuring a component of the local air velocity relative to the flying machine in a third dimension that is perpendicular to the plane that is parallel to the ground, by using a third nanowire positioned such that an angle between the third nanowire and the plane that is parallel to the ground is 30-90 degrees.

For some applications, measuring the component of the local air velocity relative to the flying machine in the third dimension includes measuring the component of the local air velocity relative to the flying machine in the third dimension that is perpendicular to the plane that is parallel to the ground, by using a third nanowire positioned such that the third nanowire is perpendicular to the plane that is parallel to the ground.

For some applications:
(a) using at least one sensor includes using a plurality of sensors to measure a respective local air velocity relative to the flying machine at the location of each sensor, each sensor comprising a plurality of nanowires and a computer processor, and
(b) using the computer processor includes using each of the computer processors to (i) receive from the plurality of sensors respective real-time data indicative of the local air velocity relative to the flying machine at the location of each sensor, and (ii) transmit the data indicative of the local air velocity relative to the flying machine at the location of each sensor to the flight control system.

For some applications, using a plurality of sensors includes using a plurality of sensors positioned at a plurality of extremities of the flying machine, respectively.

For some applications, using a plurality of sensors positioned at a plurality of extremities of the flying machine includes using a plurality of sensors positioned on a plurality of arms of a multi-rotor aircraft.

There is further provided, in accordance with some applications of the present invention, a method for measuring a true airspeed vector of a flying machine, the method including:
  measuring the true airspeed vector of a flying machine comprising at least one rotating airfoil while the machine is in flight by:
    operating one or more nanowires on the flying machine to measure a local air velocity relative to the flying machine at a measurement frequency that is at least two times greater than a rotation frequency of the rotating airfoil; and
    filtering out the rotation frequency from a signal received from the nanowires.

For some applications, operating one or more nanowires on the flying machine includes operating the one or more nanowires to measure the local air velocity relative to the flying machine at a measurement frequency of 50 Hz-500 kHz.

For some applications, operating one or more nanowires on the flying machine includes operating the one or more nanowires to measure the local air velocity relative to the flying machine at a measurement frequency of 200 Hz-2000 Hz.

For some applications, operating one or more nanowires on the flying machine to measure the local air velocity relative to the flying machine includes operating one or more nanowires on the flying machine to measure vector components of the local air velocity relative to the flying machine in at least two dimensions, the nanowires being positioned such that an angle between at least one nanowire and at least one other nanowire is 30-90 degrees.

For some applications, the nanowires are positioned such that at least one nanowire and at least one other nanowire are perpendicular to each other.

For some applications:
(a) operating one or more nanowires on the flying machine to measure vector components of the local air velocity relative to the flying machine in at least two dimensions includes (i) operating the one or more nanowires to measure vector components of the local air velocity relative to the flying machine in two dimensions, and (ii) calculating vector components of the local air velocity relative to the flying machine in two respective dimensions that define a plane that is parallel to the ground, and
(b) the method further includes measuring a vector component of the local air velocity relative to the flying machine in a third dimension that is perpendicular to the plane that is parallel to the ground, by measuring a change in local barometric pressure at a sampling rate of 10-2000 Hz using a pressure sensor on the flying machine.

For some applications, measuring the change in local barometric pressure includes measuring the change in local barometric pressure at a sampling rate of 50-500 Hz using the pressure sensor on the flying machine.

For some applications:
(a) operating one or more nanowires on the flying machine to measure vector components of the local air velocity relative to the flying machine in at least two dimensions includes (i) operating the one or more nanowires to measure vector components of the local air velocity relative to the flying machine in two dimensions, and (ii) calculating vector components of the local air velocity relative to the flying machine in two respective dimensions that define a plane that is parallel to the ground, and
(b) the method further includes measuring a vector component of the local air velocity relative to the flying machine in a third dimension that is perpendicular to the plane that is parallel to the ground, by using a third nanowire positioned such that an angle between the third nanowire and the plane that is parallel to the ground is 30-90 degrees.

For some applications, measuring the vector component of the local air velocity relative to the flying machine in the third dimension includes measuring the vector component of the local air velocity relative to the flying machine in the third dimension that is perpendicular to the plane that is parallel to the ground, by using a third nanowire positioned such that the third nanowire is perpendicular to the plane that is parallel to the ground.

There is further provided, in accordance with some applications of the present invention, apparatus for measuring a true airspeed vector of a flying machine, the apparatus including:
  a flying machine;
  at least one sensor coupled to the flying machine configured to measure vector components of the true airspeed vector of the flying machine in at least two dimensions, the sensor including:
  a plurality of nanowires,
    (a) each of the nanowires being configured to measure a value of local air velocity relative to the flying machine, and
    (b) the nanowires being positioned such that an angle between at least one nanowire and at least one other nanowire is 30-90 degrees; and
  control circuitry configured to operate the plurality of nanowires to measure vector components of the true airspeed vector of the flying machine when the machine is in flight.

For some applications, the at least one sensor is disposed on an outer surface of the flying machine.

For some applications, the nanowires are positioned such that at least one nanowire and at least one other nanowire are perpendicular to each other.

For some applications, each of the nanowires is configured to measure a value of local air velocity relative to the flying machine at a measurement frequency of 50 Hz-500 kHz.

For some applications, each of the nanowires is configured to measure a value of local air velocity relative to the flying machine at a measurement frequency of 200 Hz-2000 Hz.

For some applications:
the control circuitry is configured to operate two of the nanowires to measure vector components of the true airspeed vector in two dimensions, the apparatus further including:
at least one computer processor configured to, based on the measured vector components of the true airspeed vector of the flying machine, calculate vector components of the true airspeed vector of the flying machine in two respective dimensions that define a plane that is parallel to the ground; and
a pressure sensor disposed on the outer surface of the flying machine configured to measure a change in local barometric pressure at a sampling rate of 10-2000 Hz, wherein the computer processor is further configured to, based on the measured change in barometric pressure, calculate a vector component of the true airspeed vector of the flying machine in a third dimension that is perpendicular to the plane that is parallel to the ground.

For some applications, the pressure sensor is configured to measure the change in barometric pressure at a sampling rate of 50-500 Hz.

For some applications:
the control circuitry is configured to operate a first one of the nanowires and a second one of the nanowires to measure vector components of the true airspeed vector in two dimensions,
the apparatus further includes at least one computer processor configured to, based on the measured vector components of the true airspeed vector of the flying machine, calculate vector components of the true airspeed vector of the flying machine in two respective dimensions that define a plane that is parallel to the ground, and
the control circuitry is configured to operate a third nanowire to measure a vector component of the true airspeed vector in a third dimension that is perpendicular to the plane that is parallel to the ground, the third nanowire being positioned such that an angle between the third nanowire and the plane that is perpendicular to the ground is 30-90 degrees.

For some applications, the third nanowire is positioned such that it is perpendicular to the plane that is parallel to the ground.

The present invention will be more fully understood from the following detailed description of applications thereof, taken together with the drawings, in which:

DETAILED DESCRIPTION

Figure 1:
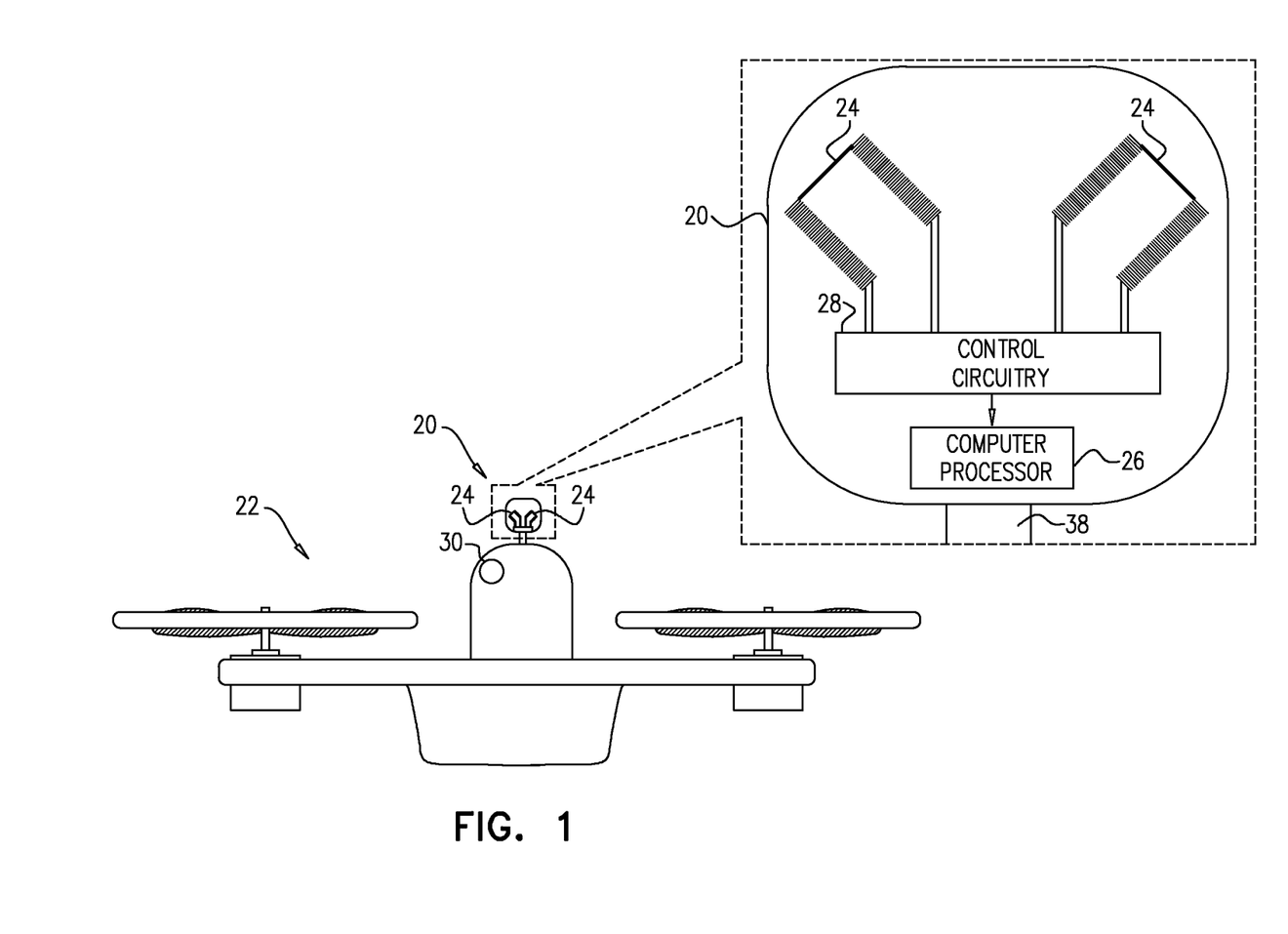
FIG. 1 is a schematic illustration of a sensor on a flying machine, the sensor including a plurality of nanowires, control circuitry, and a computer processor, in accordance with some applications of the present invention.

Reference is now made to FIG. 1, which is a schematic illustration of a sensor 20 on a flying machine 22, the sensor including a plurality of nanowires 24 and a computer processor 26, in accordance with some applications of the present invention. Sensor 20 is typically mounted on an external surface of flying machine 22, e.g., a fixed-wing aircraft, single rotor aircraft, or multi-rotor aircraft. Each nanowire measures a value of local air velocity relative to flying machine 22. Nanowires 24 are dimensioned for measuring velocity, are capable of measuring high frequency velocity changes, and can be operated using a constant current anemometer (CCA) or a constant temperature anemometer (CTA). Control circuitry 28 in sensor 20 typically operates nanowires 24 using constant temperature anemometry. An active feedback loop keeps each nanowire 24 at a constant temperature, and a current flowing through each nanowire 24 is altered accordingly so as to ensure that each nanowire 24 remains at the constant temperature. The current draw of each nanowire 24 depends on the thermal equilibrium of sensor 20—the balance of internal Joule heating within nanowire 24 and the external convective cooling due to airflow over nanowire 24. The current used to maintain each nanowire 24 is monitored, and thus a value of the local air velocity is obtained for each nanowire 24.

A velocity-sensing nanowire that is not shielded is sensitive to velocity in two directions. For example, as further described hereinbelow with reference to FIG. 4, according to the coordinate system shown in FIG. 4, the two directions in which nanowire 24 is more sensitive to velocity are (a) flow in the x-direction, and (b) flow in the y-direction. An additional nanowire can be used to separate the components of the velocity vector by positioning the two nanowires such that they are perpendicular to each other. Thus, two velocity-sensing nanowires that are perpendicular to each other can be used to measure vector components of local air velocity in two dimensions. Nanowires 24 are typically positioned within sensor 20 such that an angle between at least one nanowire 24 and at least one other nanowire 24 is 30-90 degrees (the angle being the smaller of two supplementary angles between the nanowires), e.g., the two nanowires 24 are typically perpendicular to each other, enabling sensor 20 to measure vector components of the true airspeed vector of flying machine in at least two dimensions. An additional nanowire 24, positioned 30-90 degrees, e.g., perpendicular, to a plane defined by the two nanowires 24, can be used to obtain a vector component in a third dimension. Additionally, multiple such sets of nanowires 24 may be disposed within sensor 20 to provide backup in the event that a nanowire 24 stops measuring, e.g., in case one of the nanowires breaks.

For some applications, each nanowire 24 in sensor 20 measures a value of local air velocity relative to the flying machine in one dimension. In order to measure velocity in one dimension, a nanowire is shielded such that it is exposed to the airflow in only one direction. A nanowire may be shielded from velocity flow in a specific direction by being positioned such that the nanowire is parallel to the flow in that specific direction, e.g., the z-direction of the coordinate system shown in FIG. 4. Alternatively or additionally, each nanowire 24 may be physically shielded from velocity flow in a specific direction by being placed in an open-ended tube or channel that is positioned so as to allow the nanowire exposure to the airflow in a desired direction, e.g., a nanowire 24 may be physically shielded by a channel that is formed in the encapsulation material of the nanowire. Sensor 20 may include a plurality of such shielded nanowires 24 oriented in different directions so as to measure vector components of the true airspeed vector of flying machine 22 in two or three dimensions. Additionally, multiple shielded nanowires 24 may be oriented in a common direction to provide backup in the event that a nanowire 24 stops measuring, e.g., in case one of the nanowires breaks.

Using vector components of the true airspeed vector of flying machine 22 measured by sensor 20, components of the true airspeed vector of flying machine 22 can be calculated in two respective dimensions that define a plane that is parallel to the ground. For some applications, a true airspeed vector component in a third dimension that is perpendicular to the plane that is parallel to the ground is measured by measuring a change in local barometric pressure. The local barometric pressure is measured with a pressure sensor 30 on flying machine 22. Pressure sensor 30 typically measures the barometric pressure at a sampling rate of at least 10 Hz and/or less than 2000 Hz, e.g., at least 50 Hz and/or less than 500 Hz. Alternatively or additionally, a true airspeed vector component in the third dimension that is perpendicular to the plane that is parallel to the ground is measured using a third nanowire 24 positioned such that an angle between third nanowire 24 and the plane that is parallel to the ground is 30-90 degrees, e.g., the third nanowire is perpendicular to the plane that is parallel to the ground (configuration not shown).

For some applications, sensor 20 is used to stabilize flying machine 22 while in flight. Sensor 20 on flying machine 22 measures vector components of the local air velocity relative to flying machine 22 at the location of sensor 20. Computer processor 26 receives from nanowires 24 real-time data indicative of the local air velocity relative to flying machine at the location of sensor 20. Computer processor 26 then transmits the data to a flight control system of flying machine 22. Using the transmitted data indicative of the local air velocity relative to flying machine 22 at the location of sensor 20, the flight control system can stabilize flying machine 22. In order to connect sensor 20 to the flight control system of flying machine 22, sensor 20 is typically packaged in an easy-to-install configuration and includes electrical connections 38.

As described hereinabove, sensor 20 can measure vector components of the local air velocity relative to flying machine at the location of sensor 20 in at least two dimensions. Vector components of the local air velocity relative to flying machine 22 at the location of sensor 20 can be calculated in two respective dimensions that define a plane that is parallel to the ground, and a third vector component that is perpendicular to the plane that is parallel to the ground may be measured using pressure sensor 30 and/or a third nanowire 24 that is positioned 30-90 degrees, e.g., perpendicular, to the plane that is parallel to the ground.

Figure 2:
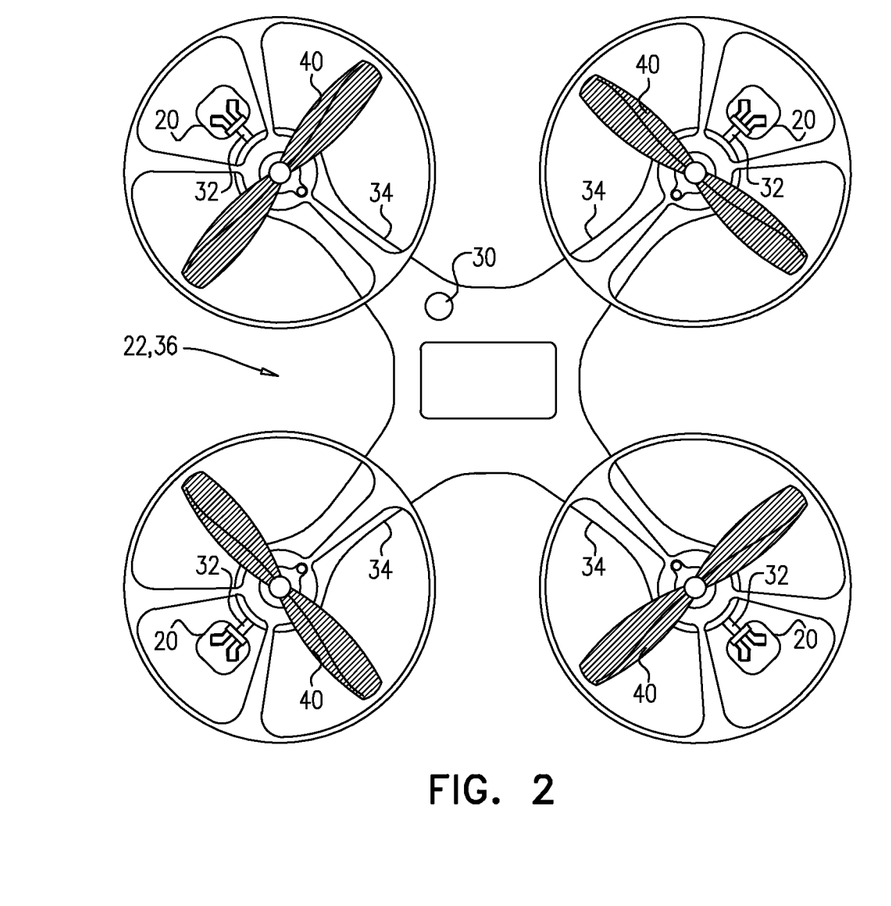
FIG. 2 is a schematic illustration of a plurality of nanowire holders mounted on a plurality of arms of a multi-rotor aircraft, and a plurality of sensors each mounted on one of the holders, in accordance with some applications of the present invention.

Reference is now made to FIG. 2, which is a schematic illustration of a plurality of nanowire holders 32 mounted on a plurality of arms 34 of a multi-rotor aircraft 36, and a plurality of sensors 20 each mounted on a holder 32, in accordance with some applications of the present invention. For some applications, the stabilizing of flying machine 22 is achieved with a plurality of sensors 20 that measure respective local air velocities relative to flying machine 22, e.g., multi-rotor aircraft 36, at the location of each sensor 20. Each one of the plurality of sensors 20 has a plurality of nanowires 24, as described hereinabove, and a computer processor 26, such as is shown in FIG. 1. The computer processors 26 (a) receive from the plurality of sensors 20 respective real-time data indicative of the local air velocity relative to flying machine 22 at the location of each sensor 20, and (b) transmit the data to the flight control system, enabling the flight control system to stabilize flying machine 22 while in flight.

For some applications, the plurality of sensors 20 are positioned at a plurality of extremities of flying machine 22, respectively. For example, the plurality of sensors 20 may be positioned on a nose, wingtips, and tail of a fixed-wing aircraft, or on a plurality of arms of a multi-rotor aircraft such as is shown in FIG. 2.

Additionally, for some applications, a measurement frequency is utilized that is at least two times, e.g., 2-2000 times, e.g., 4-500 times, greater than a periodic signal present in the airflow. Typically, nanowires 24 in sensor 20 measure local air velocity relative to the flying machine 22 at a measurement frequency of at least 50 Hz and/or less than 500 kHz, e.g., at a measurement frequency of at least 200 Hz and/or less than 2000 Hz. The broad frequency response of sensor 20 is combined with frequency spectrum analysis (e.g., fast Fourier transforms) performed by a processing device (e.g., computer processor 26) in order to identify and isolate periodic signals of interest.

For example, for some applications, one or more sensors 20 may be used to measure a true airspeed vector of a flying machine 22 that has at least one rotating airfoil 40, e.g., multi-rotor aircraft 36. Rotating airfoils 40 generates interference in the velocity field around flying machine 22. In order to overcome the interference due to the rotating airfoil and measure a true airspeed vector, nanowires 24 are operated at a measurement frequency that is at least two times greater than a rotation frequency of rotating airfoils 40. The rotation frequency is then filtered out of the signal received from nanowires 24. Related frequencies to the rotation frequency, i.e., harmonics, may also be filtered out of the signal received from nanowires 24.

For some applications, frequency and/or time analysis of the airflow signal is used for gathering information about airflow for use in understanding the characteristics of a space in which flying machine 22 is operated. For example, in a confined space (e.g., a mining tunnel) flying machine 22 may be operated with sensors 20 measuring airflow in the confined space. This can provide important information about periodic airflow signals (e.g., those generated by fans) and non-periodic airflow signals (e.g., constant airflow or transient gusts of air). For some applications, the characteristics of a space in which flying machine 22 is operated (e.g., periodic and non-periodic airflow signals within a confined space) are used for navigation techniques that rely on calculating distance and direction based on speed and time traveled since a previously known location, e.g., dead reckoning. For example, in a mining tunnel where GPS may not be available, flying machine 22 can navigate by dead reckoning while taking into account air flow characteristics of the tunnel to improve accuracy of the navigation.

Figure 3:
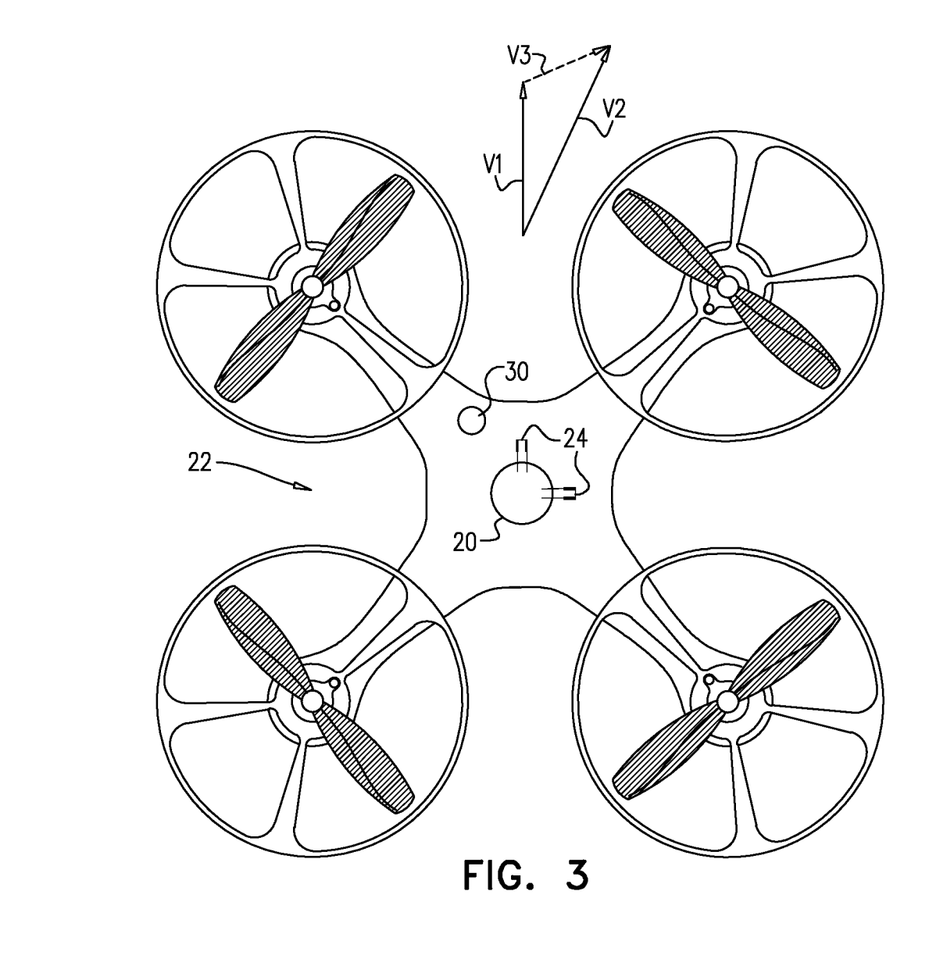
FIG. 3 is a schematic illustration of a plurality of nanowires on a flying machine, and arrows showing (a) a true airspeed vector of the flying machine, (b) a velocity of the flying machine relative to the ground, and (c) a resultant windspeed vector, in accordance with some applications of the present invention.

Reference is now made to FIG. 3, which is a schematic illustration of a plurality of nanowires 24 in sensor 20 on flying machine 22, and arrows showing (a) a true airspeed vector V1 of flying machine 22, (b) a ground velocity V2 of flying machine 22 relative to the ground, and (c) a resultant windspeed vector V3, in accordance with some applications of the present invention. For some applications, nanowires 24 in sensor 20 are used to measure true airspeed vector V1 while flying machine 22 is in flight, as described hereinabove, and a velocity V2 of flying machine 22 relative to the ground is measured while flying machine 22 is in flight. Windspeed vector V3 may be calculated by subtracting true airspeed vector V1 from velocity V2 of flying machine 22 relative to the ground (i.e., V3=V2−V1). For some applications, a global positioning system (GPS) is used to measure velocity V3 of flying machine 22 relative to the ground while flying machine 22 is in flight. Alternatively, optical flow or another technique may be used to measure velocity V3 of flying machine 22 relative to the ground while flying machine 22 is in flight.

Typically, the velocity of flying machine 22 relative to the ground (which can be measured with GPS or optical flow) does not provide a direct indication of the wind speed. This is due to the fact that the flying machine has some inertia, so when it is impacted by a gust of wind, it will not immediately begin to drift. For some applications, during this time delay, sensors 20 serve to augment the stabilization control system. The real time sensor data, for example, may quickly sense a gust of wind and allow flying machine 22 to hold its position without being diverted off course.

Figure 4:
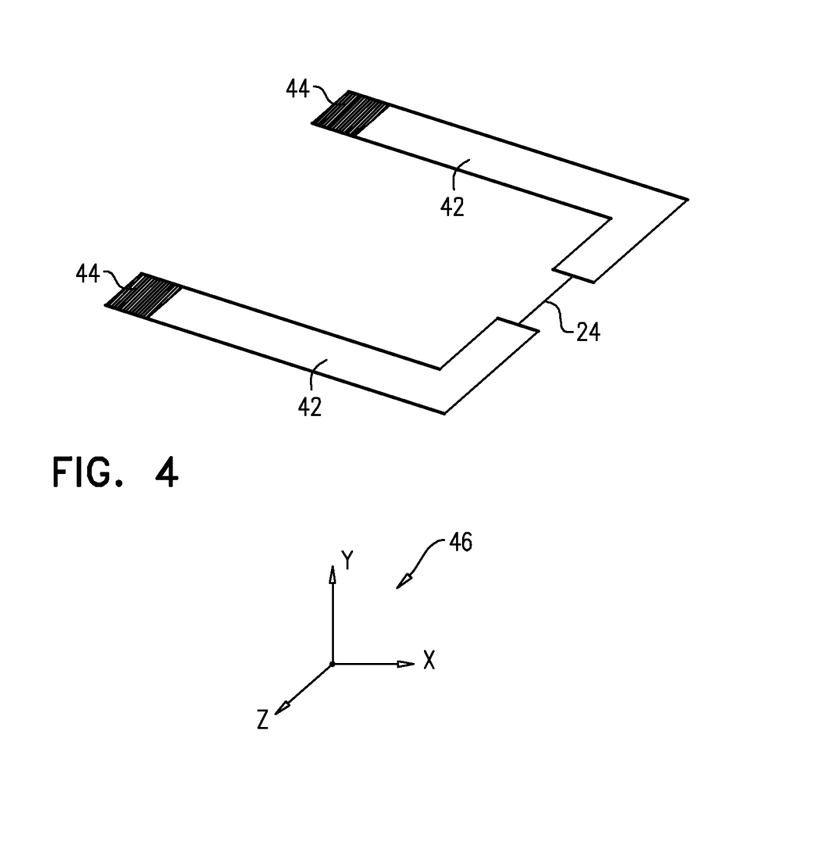
FIG. 4 is a schematic illustration of a nanowire held by support structures, in accordance with some applications of the present invention.

Reference is now made to FIG. 4, which is a schematic illustration of nanowire 24 held by support structures 42, in accordance with some applications of the present invention. For some applications support structures 42 have soldering pads 44 for securing nanowire 24 within sensor 20. A coordinate system 46 is shown with the z-axis parallel to nanowire 24. For some applications a velocity-sensing nanowire 24 may be shielded from sensing air velocity in a specific direction by being oriented such that nanowire 24 is parallel to that direction. For example, with reference to coordinate system 46 of FIG. 4, nanowire 24 is shielded from sensing air velocity in the z-direction, and is capable of sensing air velocity in the x-direction and in the y-direction.

Figure 5:
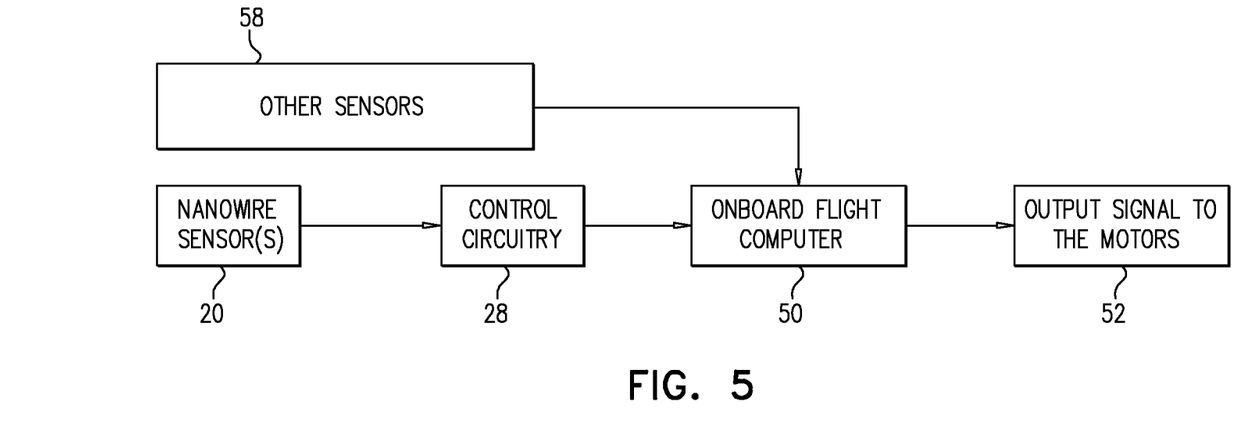
FIG. 5 is a block diagram showing integration of data from the sensor with data from traditional flight sensors, in accordance with some applications of the present invention.

Reference is now made to FIG. 5, which is a block diagram showing integration of data from sensor 20 with data from traditional flight sensors, e.g., GPS, downward facing cameras (optical flow), accelerometers, and gyroscopes. Nanowire(s) 24 within sensor(s) 20 are operated by control circuitry 28 and the data, e.g., direct measurement of air speed velocity, are inputted into an onboard flight computer 50. Data obtained from traditional flight sensors which may also be mounted on flying machine 22, e.g., GPS, downward facing camera(s) (optical flow), accelerometer(s), and gyroscope(s), are inputted to onboard flight computer 50 as well. Onboard flight computer 50 then implements a control algorithm based on the combined data and sends output signals to the motors 52 of flying machine 22.

The addition of nanowire flow sensors onto a flying machine, as provided in accordance with some applications of the present invention described herein, allows for the implementation of a more "proactive" rather than "reactive" control scheme. First, consider the traditional method of stabilizing a flying machine (e.g., a small, lightweight UAV) during a gust of wind. If the UAV is hovering and then hit by a strong gust of wind, it will be blown away from its initial position. This drift will be registered by multiple sensors onboard the vehicle—the accelerometer will measure the change in velocity, the GPS will detect change in position, and the downward facing camera will detect movement relative to the ground. The control system will then adjust the output to the motors so that the vehicle can regain the desired position. This is an example of a "reactive" control scheme that requires the vehicle to drift off course before it can be corrected back to its original position.

Figure 6:
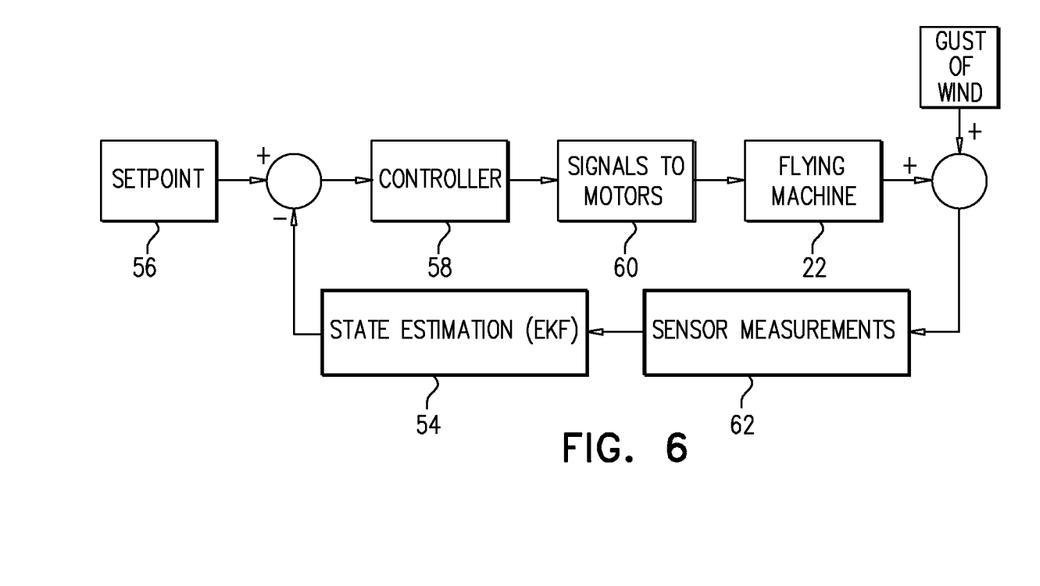
FIG. 6 is a block diagram showing an implementation of a feedback control loop utilizing data from the sensor as input to a state estimator, in accordance with some applications of the present invention.

Now consider the method of stabilizing a flying machine, e.g., flying machine 22, equipped with nanowire airflow sensors as provided by some applications of the present invention, e.g., as shown in FIG. 5 and FIG. 6. In this case, as the gust of wind begins to impact flying machine 22, the change in the windspeed vector will be sensed in real time by the nanowires 24, typically prior to position-change detectors (e.g., GPS) detecting a position change due to the gust of wind. As shown in FIG. 5, nanowires 24 are operated by control circuitry 28, which typically provides calibrated velocity data to the onboard flight computer 50. This information is then integrated into an estimate of the flying machine state, e.g., using an extended Kalman filter (EKF) or other state estimator. With this additional information, flying machine 22 adjusts its configuration, in effect bracing itself for the gust of wind. For instance, the controller may command flying machine 22 to increase its pitch angle to compensate for a gust of wind hitting the front of flying machine 22.

Reference is now made to FIG. 6, which is a block diagram showing an implementation of a feedback control loop that utilizes data from sensor 20 as input to a state estimation 54. This is an example of a proactive control scheme: rather than waiting for a threshold drift in a more reactive scheme, the real-time data from the nanowires allows the controller provided by applications of the present invention to outperform a reactive system in terms of stabilization and position control. Setpoint 56 represents a desired position and attitude for flying machine 22. State estimation 54 represents the current position and attitude for flying machine 22. The current position and attitude are in effect subtracted from setpoint 56 in order to obtain any error in position and attitude, e.g., an error caused by a gust of wind pushing flying machine 22 off-course. The error is input into a linear or non-linear controller 58, e.g., an onboard flight computer. Controller 58 then outputs signals 60 to the motor(s) of flying machine 22, which, in response to signals 60, alter the position and attitude of flying machine 22 to correct for the error. In addition, real-time air velocity measurements from sensor(s) 20 are typically used to detect the presence of an external disturbance, e.g., a gust of wind, and the data are used as an input to state estimation 54, allowing controller 58 to send signals 60 to the motor(s) even before a threshold difference is detected between setpoint 56 and state estimation 54.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for stabilizing a flying machine while the machine is in flight over ground, the method comprising:
   using at least one sensor on the flying machine, measuring a local air velocity relative to the flying machine at a location of the sensor, the sensor comprising a plurality of nanowires and a computer processor,
   (a) each of the nanowires being configured to measure a value of local air velocity; relative to the flying machine, and
   (b) the nanowires being positioned such that the sensor is configured to measure vector components of the local air velocity relative to the flying machine in at least two dimensions;
   using the computer processor of the at least one sensor:
   (a) receive from the nanowires real-time data indicative of the local air velocity relative to the flying machine, and
   (b) transmit the data indicative of the local air velocity relative to the flying machine to a flight control system of the flying machine; and using the flight control system, stabilizing the flying machine using the transmitted data.

2. The method according to claim 1, wherein:
   using the computer processor comprises receiving from the nanowires real-time data indicative of the local air velocity relative to the flying machine, the local air velocity being indicative of a gust of wind; and
   using the flight control system comprises stabilizing the flying machine against the gust of wind using the transmitted data.

3. The method according to claim 1, wherein measuring the local air velocity relative to the flying machine at the location of the sensor comprises operating the sensor to measure the local air velocity relative to the flying machine at a measurement frequency of 50 Hz-500 kHz.

4. The method according to claim 1, wherein the nanowires being positioned such that the sensor is configured to measure the vector components of the local air velocity relative to the flying machine in the at least two dimensions comprises the nanowires being positioned such that an angle between at least one nanowire and at least one other nanowire is 30-90 degrees.

5. The method according to claim 4, wherein the nanowires being positioned comprises the nanowires being positioned such that at least one nanowire and at least one other nanowire are perpendicular to each other.

6. The method according to claim 4, wherein:
   (a) the nanowires being positioned such that the sensor is configured to measure the vector components of the local air velocity relative to the flying machine in the at least two dimensions comprises the nanowires being positioned such that the sensor is configured to measure vector components of the local air velocity relative to the flying machine in two dimensions; and
   (b) the method further comprises:
   (i) based on the measured vector components of the local air velocity relative to the flying machine in the two dimensions, calculating two vector components of the local air velocity relative to the flying machine in two respective dimensions that define a plane that is parallel to the ground, and
   (ii) measuring a component of the local air velocity relative to the flying machine in a third dimension that is perpendicular to the plane that is parallel to the ground, by measuring a change in local barometric pressure at a sampling rate of 10-2000 Hz using a pressure sensor on the flying machine.

7. The method according to claim 4, wherein:
   (a) the nanowires being positioned such that the sensor is configured to measure the vector components of the local air velocity relative to the flying machine in the at least two dimensions comprises the nanowires being positioned such that the sensor is configured to measure vector components of the local air velocity relative to the flying machine in two dimensions, and
   (b) the method further comprises:
   (i) based on the measured vector components of the local air velocity relative to the flying machine in the two dimensions, calculating two vector components of the local air velocity relative to the flying machine in two respective dimensions that define a plane that is parallel to the ground; and
   (ii) measuring a component of the local air velocity relative to the flying machine in a third dimension that is perpendicular to the plane that is parallel to the ground, by using a third nanowire positioned such that an angle between the third nanowire and the plane that is parallel to the ground is 30-90 degrees.

8. The method according to claim 1, wherein:
   (a) using at least one sensor comprises using a plurality of sensors to measure a respective local air velocity relative to the flying machine at the location of each sensor, each sensor comprising a plurality of nanowires and a computer processor, and
   (b) using the computer processor comprises using each of the computer processors to (i) receive from the plurality of sensors respective real-time data indicative of the local air velocity relative to the flying machine at the location of each sensor, and (ii) transmit the data indicative of the local air velocity relative to the flying machine at the location of each sensor to the flight control system.

9. A method for measuring a true airspeed vector of a flying machine that is in flight over ground, the method comprising:
   measuring the true airspeed vector of a flying machine comprising at least one rotating airfoil while the machine is in flight by:
   operating one or more nanowires on the flying machine to measure a local air velocity relative to the flying machine at a measurement frequency that is at least two times greater than a rotation frequency of the rotating airfoil; and
   filtering out the rotation frequency from a signal received from the nanowires.

10. The method according to claim 9, wherein operating the one or more nanowires on the flying machine comprises operating the one or more nanowires to measure the local air velocity relative to the flying machine at a measurement frequency of 50-500 kHz.

11. The method according to claim 9, wherein operating the one or more nanowires on the flying machine to measure the local air velocity relative to the flying machine comprises operating one or more nanowires on the flying machine to measure vector components of the local air velocity relative to the flying machine in at least two dimensions, the nanowires being positioned such that an angle between at least one nanowire and at least one other nanowire is 30-90 degrees.

12. The method according to claim 11, wherein the nanowires are positioned such that at least one nanowire and at least one other nanowire are perpendicular to each other.

13. The method according to claim 11:
(a) wherein operating the one or more nanowires on the flying machine to measure the vector components of the local air velocity relative to the flying machine in the at least two dimensions comprises (i) operating the one or more nanowires to measure vector components of the local air velocity relative to the flying machine in two dimensions, and (ii) based on the measured vector components of the local air velocity relative to the flying machine in the two dimensions, calculating two vector components of the local air velocity relative to the flying machine in two respective dimensions that define a plane that is parallel to the ground, and
(b) the method further comprising measuring a vector component of the local air velocity relative to the flying machine in a third dimension that is perpendicular to the plane that is parallel to the ground, by measuring a change in local barometric pressure at a sampling rate 10-2000 Hz using a pressure sensor on the flying machine.

14. The method according to claim 11:
(a) wherein operating the one or more nanowires on the flying machine to measure the vector components of the local air velocity relative to the flying machine in the at least two dimensions comprises (i) operating the one or more nanowires to measure vector components of the local air velocity relative to the flying machine in two dimensions, and (ii) based on the measured vector components of the local air velocity relative to the flying machine in the two dimensions, calculating two vector components of the local air velocity relative to the flying machine in two respective dimensions that define a plane that is parallel to the ground, and
(b) the method further comprising measuring a vector component of the local air velocity relative to the flying machine in a third dimension that is perpendicular to the plane that is parallel to the ground, by using a third nanowire positioned such that an angle between the third nanowire and the plane that is parallel to the ground is 30-90 degrees.

15. Apparatus for measuring a true airspeed vector of a flying machine that is in flight over ground, the apparatus comprising:
a flying machine;
at least one sensor coupled to the flying machine configured to measure vector components of the true airspeed vector of the flying machine in at least two dimensions, the sensor comprising:
a plurality of nanowires,
(a) each of the nanowires being configured to measure a value of local air velocity relative to the flying machine, and
(b) the nanowires being positioned such that an angle between at least one nanowire and at least one other nanowire is 30-90 degrees; and
control circuitry configured to operate the plurality of nanowires to measure the vector components of the true airspeed vector of the flying machine when the machine is in flight.

16. The apparatus according to claim 15, wherein the at least one sensor is disposed on an outer surface of the flying machine.

17. The apparatus according to claim 15, wherein the nanowires are positioned such that at least one nanowire and at least one other nanowire are perpendicular to each other.

18. The apparatus according to claim 15, wherein each of the nanowires is configured to measure a value of the local air velocity relative to the flying machine at a measurement frequency of 50 Hz-500 kHz.

19. The apparatus according to claim 15, wherein:
the control circuitry is configured to operate two of the nanowires to measure the vector components of the true airspeed vector in the two dimensions, the apparatus further comprising:
at least one computer processor configured to, based on the measured vector components of the true airspeed vector of the flying machine, calculate the vector components of the true airspeed vector of the flying machine in the two respective dimensions that define a plane that is parallel to the ground; and
a pressure sensor disposed on the outer surface of the flying machine configured to measure a change in local barometric pressure at a sampling rate of 10-2000 Hz, wherein the computer processor is further configured to, based on the measured change in barometric pressure, calculate a vector component of the true airspeed vector of the flying machine in a third dimension that is perpendicular to the plane that is parallel to the ground.

20. The apparatus according to claim 15, wherein:
the control circuitry is configured to operate a first one of the nanowires and a second one of the nanowires to measure the vector components of the true airspeed vector in the two dimensions,
the apparatus further comprises at least one computer processor configured to, based on the measured vector components of the true airspeed vector of the flying machine, calculate the vector components of the true airspeed vector of the flying machine in the two respective dimensions that define a plane that is parallel to the ground, and
the control circuitry is configured to operate a third nanowire to measure a vector component of the true airspeed vector in a third dimension that is perpendicular to the plane that is parallel to the ground, the third nanowire being positioned such that an angle between the third nanowire and the plane that is perpendicular to the ground is 30-90 degrees.

* * * * *